United States Patent
Sato et al.

(10) Patent No.: US 9,156,988 B2
(45) Date of Patent: Oct. 13, 2015

(54) DISPERSE DYE COMPOSITION AND DYEING METHOD FOR HYDROPHOBIC FIBER MATERIAL USING SAME

(75) Inventors: Yoshiyuki Sato, Tokyo (JP); Toru Yamaguchi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 25 days.

(21) Appl. No.: 14/119,626

(22) PCT Filed: Jun. 7, 2012

(86) PCT No.: PCT/JP2012/064619
§ 371 (c)(1),
(2), (4) Date: Nov. 22, 2013

(87) PCT Pub. No.: WO2012/169564
PCT Pub. Date: Dec. 13, 2012

(65) Prior Publication Data
US 2014/0082860 A1    Mar. 27, 2014

(30) Foreign Application Priority Data
Jun. 10, 2011   (JP) ................. 2011-130014

(51) Int. Cl.
| | |
|---|---|
| C09B 67/00 | (2006.01) |
| C09B 67/22 | (2006.01) |
| C09B 5/62 | (2006.01) |
| D06P 1/20 | (2006.01) |
| C09B 1/22 | (2006.01) |
| C09B 1/32 | (2006.01) |
| C09B 1/503 | (2006.01) |
| D06P 1/16 | (2006.01) |
| C09B 29/08 | (2006.01) |
| C09B 29/40 | (2006.01) |
| C09B 1/54 | (2006.01) |
| D06P 3/54 | (2006.01) |
| D06P 3/60 | (2006.01) |

(52) U.S. Cl.
CPC ............... *C09B 67/0051* (2013.01); *C09B 1/22* (2013.01); *C09B 1/32* (2013.01); *C09B 1/503* (2013.01); *C09B 1/545* (2013.01); *C09B 1/547* (2013.01); *C09B 5/62* (2013.01); *C09B 29/0825* (2013.01); *C09B 29/3613* (2013.01); *C09B 67/0038* (2013.01); *D06P 1/16* (2013.01); *D06P 1/20* (2013.01); *D06P 3/54* (2013.01); *D06P 3/6041* (2013.01)

(58) Field of Classification Search
CPC .. C09B 67/0051; C09B 67/0038; C09B 1/22; C09B 1/32; C09B 5/62
USPC ............................................. 8/643
See application file for complete search history.

(56) References Cited

U.S. PATENT DOCUMENTS

2006/0230549 A1* 10/2006 Hihara et al. ................... 8/534

FOREIGN PATENT DOCUMENTS

| JP | 58-84860 A | 5/1983 | |
| JP | 07258572 | * 10/1995 | .......... C09B 67/0051 |
| JP | 2004-168950 A | 6/2004 | |
| JP | 2005/023254 | * 1/2005 | ............. C09B 67/22 |
| JP | 2005-23254 A | 1/2005 | |
| JP | 2006/225538 | * 8/2006 | ............. C09B 67/22 |
| JP | 2006-225538 A | 8/2006 | |
| WO | 2007/058209 A1 | 5/2007 | |
| WO | 2012/067027 A1 | 5/2012 | |

OTHER PUBLICATIONS

STIC Search Report dated Feb. 24, 2015.*
International Search Report and Written Opinion mailed Jul. 31, 2012 in corresponding PCT application No. PCT/JP2012/064619.
International Preliminary Report on Patentability mailed Dec. 27, 2013 in corresponding PCT application No. PCT/JP2012/064619.

* cited by examiner

*Primary Examiner* — Eisa Elhilo
(74) *Attorney, Agent, or Firm* — Nields, Lemack & Frame, LLC

(57) ABSTRACT

An object of the present invention is provide a disperse dye composition that has the light fastness required of synthetic fiber materials for automotive interiors that are exposed to sunlight at high temperature and high humidity, and that has good blue, red, and yellow dyeability. This object is achieved by a mixed disperse dye composition comprising a blue disperse dye composition having a specific composition ratio of five specific types of disperse dyes, and other specific yellow and/or red disperse dyes. The invention makes it possible to provide a disperse dye composition having not only high fastness of each color but light fastness with a favorable balance of the three primary colors, with the dye properties of each color equal during dyeing, and good dye color reproducibility, as well as by a dyeing method using this dye.

20 Claims, No Drawings

DISPERSE DYE COMPOSITION AND DYEING METHOD FOR HYDROPHOBIC FIBER MATERIAL USING SAME

TECHNICAL FIELD

The present invention relates to a disperse dye composition and a dyeing method using the same. More specifically, the present invention relates to a disperse dye composition comprising specified dyes, and a method for dyeing a hydrophobic fiber material using the disperse dye composition.

BACKGROUND ART

Synthetic fiber materials for use in automotive interior materials are required for having a high temperature resistance and a high light resistance because automotive interiors reach high temperature and high humidity and the synthetic fiber materials are exposed to sunlight over a much longer time than other common clothing fiber materials. In order to meet such a requirement, a method is adopted in which dyes having a high light resistance are used to dye fibers. However, if a yellow dye, a red dye and a blue dye are not in balance of light resistance, only a part of colors is faded due to a long period of light exposure, easily resulting in that discoloration of these dyes as a whole gradually appears larger over time. Therefore, a yellow dye, a red dye and a blue dye to be used are required for achieving a balanced light resistance so that these colors are equally faded, but no dyes have been obtained which satisfy such a requirement.

In addition, the synthetic fiber materials achieve a different depth of dyeing, different dyeing shade, and the like from one another even by the same dyeing method, due to the differences in yarn thickness and yarn shape as well as the difference of blended fibers or the like in which a polyester fiber to be used is blended with other material. In order to dye and process such synthetic fiber materials having a different shape and different properties equally each time, there is a need for dyes excellent in dyeing reproducibility even under various dyeing conditions.

In particular, when automotive interior materials are dyed, dyeing is performed with the use of disperse dyes having a high fastness to environmental conditions as much as possible. However, if a yellow dye, a red dye and a blue dye are not even with one another in terms of dyeing properties, such unevenness causes the difference in dyeing reproducibility among synthetic fiber materials dyed. Accordingly, in order to dye automotive interior materials, there are needs for high light fastness of each colors of a yellow dye, a red dye and a blue dye, which are also in balance with one another, as well as for even dyeing characteristics and a favorable dyeing reproducibility.

Although various disperse dye compositions have been disclosed in Patent Literatures 1 to 3 etc. below, no dye compositions satisfying the above needs have not been described therein.

CITATION LIST

Patent Literature

Patent Literature 1: JP 2005-23254 A
Patent Literature 2: JP 2004-168950 A
Patent Literature 3: WO 2007/058209

SUMMARY OF INVENTION

Technical Problem

A first object of the present invention is to provide a mixed disperse dye composition having high light fastness of each color of a yellow dye, a red dye and a blue dye and being excellent in balance of light fastness among these dyes, which has even dyeing characteristics of the respective colors at dyeing, and favorable dyeing reproducibility, and also to provide a dyeing method using the same.

A second object of the present invention is to provide a novel blue disperse dye composition adapted to such a mixed disperse dye composition.

Solution to Problem

The first object is achieved by a mixed disperse dye composition which comprises a combination of a blue disperse dye composition comprising five specified disperse dyes in a specified composition ratio with other specified components of various disperse dyes, to thereby have a well-balanced fastness to environment (in particular, light fastness) among the three primary colors, even dyeing characteristics of the respective colors at dyeing and a favorable dyeing reproducibility, and by a dyeing method using the same.

In addition, the second object is achieved by a blue disperse dye composition comprising five specified disperse dyes in a specified composition ratio, which is adapted to such a mixed disperse composition.

That is, aspects of the present invention are as follows.

[1] A blue disperse dye composition, comprising;

0.5 to 5.0% by weight of a disperse dye represented by the following formula (1);

25.0 to 60.0% by weight of a disperse dye represented by the following formula (2);

3.0 to 15.0% by weight of a disperse dye represented by the following formula (3);

15.0 to 40.0% by weight of a disperse dye represented by the following formula (4); and 10.0 to 30.0% by weight of a disperse dye represented by the following formula (5);

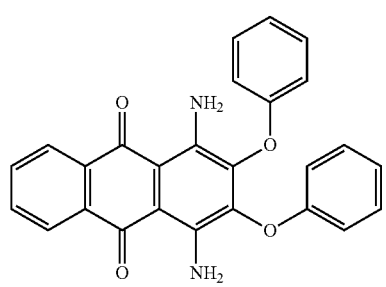

(1)

-continued (2)

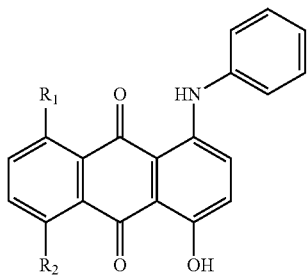

wherein $R_1$ represents a nitro group and $R_2$ represents a hydroxyl group, or $R_1$ represents a hydroxyl group and $R_2$ represents a nitro group;

(3)

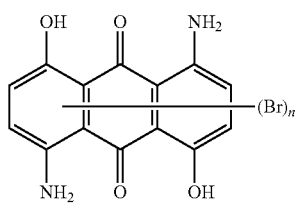

wherein n is an integer of 1 to 4;

(4)

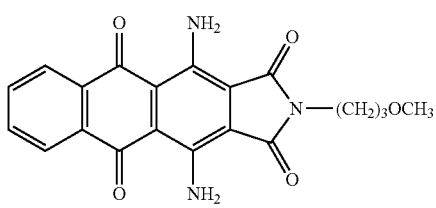

(5)

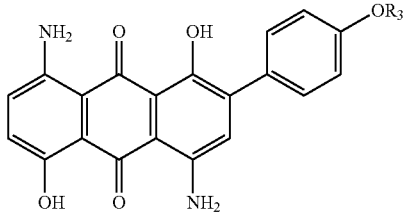

wherein $R_3$ represents a methyl group or an ethyl group, or a mixture thereof.

[2] A mixed disperse dye composition comprising the blue disperse dye composition according to [1] and a yellow disperse dye composition, wherein the yellow disperse dye composition comprises:

8.0 to 20.0% by weight of a disperse dye represented by the following formula (6);

55.0 to 80.0% by weight of a disperse dye represented by the following formula (7); and 5.0 to 15.0% by weight of a disperse dye represented by the following formula (8).

(6)

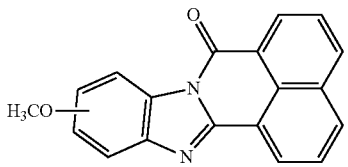

(7)

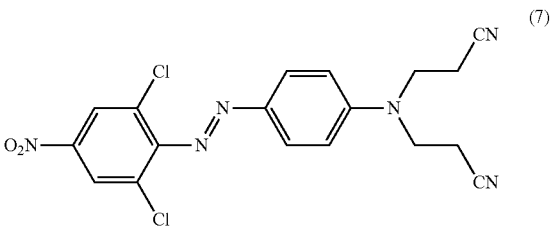

(8)

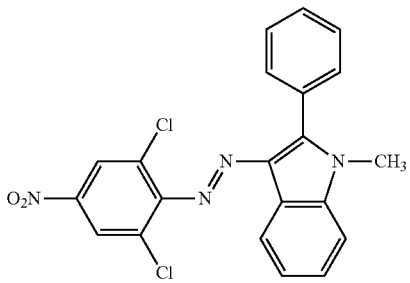

[3] A mixed disperse dye composition, comprising:
the blue disperse dye composition according to [1], and
a red disperse dye composition which is one or more dyes selected from disperse dyes represented by the following formula (9);

(9)

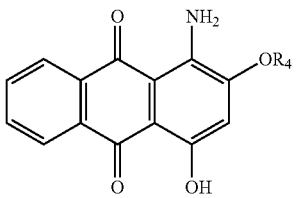

wherein $R_4$ represents an optionally substituted alkyl group having 1 to 6 carbon atoms, or an optionally substituted phenyl group.

[4] The mixed disperse dye composition according to [3], wherein the red disperse dye composition is a red disperse dye composition comprising one or more dyes selected from dyes of the following formula (9-1), the following formula (9-2) and the following formula (9-3).

(9-1)

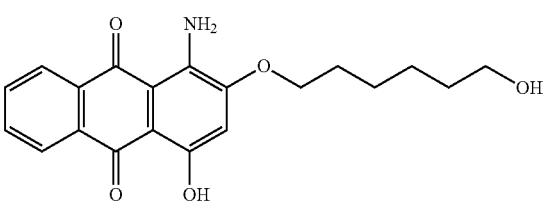

-continued

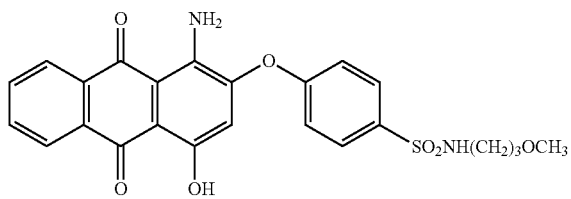
(9-2)

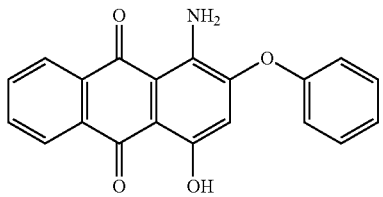
(9-3)

[5] A mixed disperse dye composition, comprising:
the mixed disperse dye composition according to [2]; and
a red disperse dye composition comprising one or more dyes selected from dyes of the following formula (9-1), the following formula (9-2) and the following formula (9-3).

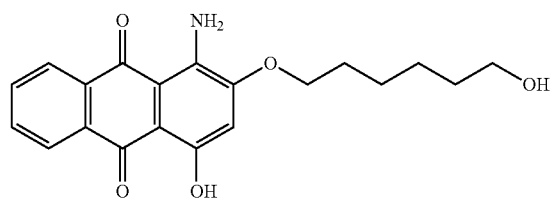
(9-1)

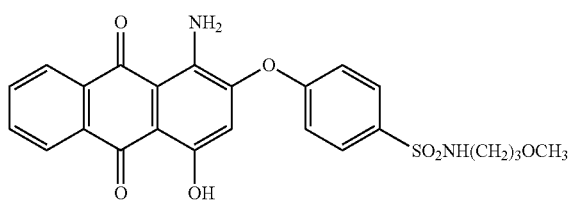
(9-2)

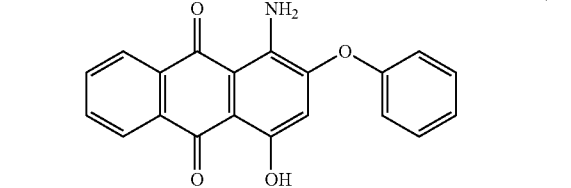
(9-3)

[6] A dyeing method for a hydrophobic fiber material, wherein the disperse dye composition according to any one of [1] to [5] is used.

[7] A hydrophobic fiber material dyed in accordance with the dyeing method according to [6].

[8] An article including the hydrophobic fiber material according to [7].

Advantageous Effects of Invention

A synthetic fiber material dyed using the blue disperse dye composition comprising five specified disperse dyes in a specified composition ratio or using the mixed disperse dye composition further comprising other specified yellow and/or red disperse dye(s), according to the present invention, has such properties that fastness to environment (in particular, light fastness) is excellent and a fastness balance among the three primary colors is also good. Additionally, the mixed disperse dye composition of the present invention also has such properties that dyeing characteristics of the respective colors at dyeing are even and dyeing reproducibility is favorable.

DESCRIPTION OF EMBODIMENTS

Hereinafter, the present invention will be described in detail.

A blue disperse dye composition of the present invention comprises 0.5 to 5.0% by weight of a disperse dye represented by the formula (1), 25.0 to 60.0% by weight of a disperse dye represented by the formula (2) [wherein $R_1$ represents a nitro group and $R_2$ represents a hydroxyl group, or $R_1$ represents a hydroxyl group and $R_2$ represents a nitro group], 3.0 to 15.0% by weight of a disperse dye represented by the formula (3) [wherein n is an integer of 1 to 4], 15.0 to 40.0% by weight of a disperse dye represented by the formula (4), and 10.0 to 30.0% by weight of a disperse dye represented by the formula (5) [wherein $R_3$ represents a methyl group or an ethyl group, or a mixture thereof]. The blue disperse dye composition has an excellent light fastness by itself.

The disperse dye represented by the formula (1) is known as C.I.Disperse Violet 26. The dye can be produced based on a known document, or a commercially available one can be used.

The disperse dye represented by the formula (2) is a compound wherein $R_1$ represents a nitro group and $R_2$ represents a hydroxyl group or wherein $R_1$ represents a hydroxyl group and $R_2$ represents a nitro group, or also may be a mixture thereof. Examples of the dye include a dye known as C.I.Disperse Blue 77. In addition, the dye can be produced based on a known document, or a commercially available one can be used.

The disperse dye represented by the formula (3) is not particularly limited as long as such a number of and positions of bromine atoms for substitution are possible, and the disperse dye may be a mixture thereof. Examples of the dye include a dye known as C.I.Disperse Blue 56. In addition, the dye can be produced based on a known document, or a commercially available one can be used.

The disperse dye represented by the formula (4) is known as C.I.Disperse Blue 60. The dye can be produced based on a known document, or a commercially available one can be used.

The disperse dye represented by the formula (5) can be produced by a known production method or a production method where the known production method is applied. In addition, one wherein $R_3$ represents a mixture of a methoxy group and an ethoxy group in the formula (5) is a dye described in JP 4-164968 A, etc., and the dye which is commercially available may also be used.

A mixed disperse dye composition of the present invention comprises the above-described blue disperse dye composition, and a yellow disperse dye composition comprising 8.0 to 20.0% by weight of a disperse dye represented by the formula (6), 55.0 to 80.0% by weight of a disperse dye represented by the formula (7), and 5.0 to 15.0% by weight of a disperse dye represented by the formula (8). Herein, the blue disperse dye composition and the yellow disperse dye composition are excellent in light fastness and are well-balanced in terms of light fastness, and also have even dyeing characteristics of the respective colors at dyeing.

The disperse dye represented by the formula (6) is known as C.I.Disperse Yellow 71. The dye can be produced based on a known document, or a commercially available one can be used. The substitution position of a methoxy group with which a phenyl group in a benzoimidazole structure is substituted is not particularly limited, and the dye may also be a mixture thereof.

The disperse dye represented by the formula (7) is known as C.I.Disperse Yellow 163. The dye can be produced based on a known document, or a commercially available one can be used.

The disperse dye represented by the formula (8) is known as C.I.Disperse Orange 155. The dye can be produced based on a known document, or a commercially available one can be used.

Another mixed disperse dye composition of the present invention comprises the blue disperse dye composition, and a red disperse dye composition which is one or more dyes selected from disperse dyes represented by the formula (9) [wherein $R_4$ represents an optionally substituted alkyl group having 1 to 6 carbon atoms, or an optionally substituted phenyl group]. Herein, the blue disperse dye composition and the red disperse dye composition are excellent in light fastness and are well-balanced in terms of light fastness, and also have even dyeing properties of the respective colors at dyeing.

Examples of the optionally substituted alkyl group having 1 to 6 carbon atoms include a methyl group, a hydroxyethyl group, a hydroxypropyl group, a hydroxyhexyl group, a hydroxybutyl group, a methoxyethyl group, a methoxypropyl group, a hydroxyethoxyethyl group, and a methoxyethoxyethyl group.

Examples of substituent(s) in the optionally substituted phenyl group include an N-methoxypropyl sulfoamide group, a thiomethyl group, a hydroxy group, a methoxyethoxy group, and a halogen atom. A number of the substituent(s) is preferably 1, and the substitution position of the substituent is not particularly limited as long as such substitution can be made.

Among the disperse dyes represented by the formula (9), a red disperse dye composition comprising one or more dyes selected from dyes of the formula (9-1), the formula (9-2) and the formula (9-3) is preferred.

The disperse dye represented by the formula (9-1) is known as C.I.Disperse Red 60. The dye can be produced based on a known document, or a commercially available one can be used.

The disperse dye represented by the formula (9-2) is known as C.I.Disperse Red 91. The dye can be produced based on a known document, or a commercially available one can be used.

The disperse dye represented by the formula (9-3) is known as C.I.Disperse Red 92. The dye can be produced based on a known document, or a commercially available one can be used.

Furthermore, a mixed disperse dye composition can also be prepared which comprises the above-described blue disperse dye composition; a yellow disperse dye composition comprising 8.0 to 20.0% by weight of a disperse dye represented by the formula (6), 55.0 to 80.0% by weight of a disperse dye represented by the formula (7) and 5.0 to 15.0% by weight of a disperse dye represented by the formula (8); and a red disperse dye composition which is one or more dyes selected from disperse dyes represented by the formula (9) [wherein $R_4$ represents an optionally substituted alkyl group having 1 to 6 carbon atoms, or an optionally substituted phenyl group]. The mixed disperse dye composition preferably comprises the blue disperse dye composition; a yellow disperse dye composition comprising 8.0 to 20.0% by weight of a disperse dye represented by the formula (6), 55.0 to 80.0% by weight of a disperse dye represented by the formula (7) and 5.0 to 15.0% by weight of a disperse dye represented by the formula (8); and a red disperse dye composition comprising one or more dyes selected from dyes of the formula (9-1), the formula (9-2) and the formula (9-3). Herein, the blue disperse dye composition, the yellow disperse dye composition and the red disperse dye composition are excellent in light fastness and are well-balanced in terms of light fastness, and also have even dyeing chracteristics of the respective colors at dyeing, and the mixed disperse dye composition comprising these compositions has a favorable dyeing reproducibility.

The disperse dye composition (or mixed disperse dye composition) of the present invention can be used with other disperse dye being mixed in order to adjust shade or to adjust fastness, dyeing characteristics, and the like. The composition can also be used with other disperse dye being added at dyeing.

Similarly, the composition can also be used with a dye other than the disperse dye, such as a direct dye, a reactive dye, or a basic dye, being mixed. The composition may also be used with other dye or dyeing agent being added at dyeing.

Besides them, the disperse dye composition of the present invention may also include a solvent such as water, a carrier described later, and a dispersant described later.

The disperse dye composition of the present invention may be formed into a desired disperse dye composition by mixing respective bulk powder of the disperse dyes in necessary amounts and then subjecting them to a pulverization (dispersion) treatment. Alternatively, the respective bulk powder of the dyes may also be separately subjected to a pulverization (dispersion) treatment and then mixed. In the latter case, the disperse dyes each separately subjected to a pulverization (dispersion) treatment in a dye bath may also be added to form the disperse dye composition in a dye bath.

Alternatively, a dispersant described below may be later added to the disperse dye composition subjected to pulverization.

Generally, a method for the pulverization treatment may be carried out as follows: a dispersant and the bulk powder of the disperse dyes is sufficiently wet-ground using a grinding machine such as a ball mill or a sand mill in the presence of a small amount of water until reaching usually about 0.2 to 2 μm; and examples of the dispersant include a formaldehyde condensate of naphthalenesulfonic acid and alkylbenzene sulfonic acid, a formaldehyde condensate of naphthalenesulfonic acid, a formaldehyde condensate of cresolsulfonic acid, a formaldehyde condensate of cresol and 2-naphthol-6-sulfonic acid, a formaldehyde condensate of alkylnaphthalene sulfonic acid, or a formaldehyde condensate of creosote oil sulfonic acid; an anionic dispersant such as lignosulfonic acid; a nonionic dispersant such as a block copolymer of ethylene oxide and propylene oxide, an ethylene oxide adduct of an alkylphenol, or an ethylene oxide adduct of polystyrenated phenol; and a mixture of the anionic dispersant and the nonionic dispersant.

The disperse dye composition of the present invention is utilized for dyeing in the form of liquid or paste as-pulverized, or after drying by a spray drying method or the like.

Then, a method for dyeing a hydrophobic fiber material using the disperse dye composition of the present invention will be described. Examples of the hydrophobic fiber material include, but not particularly limited, synthetic fibers such as polyester (PET) fiber, triacetate fiber, diacetate fiber or polyamide fiber, or mixed spinning fiber thereof. The hydrophobic fiber material may also be mixed spinning fibers of such a synthetic fiber with a recycled fiber such as rayon or natural fiber such as cotton, silk or wool. In addition, the fineness of the hydrophobic fiber material is not particularly limited, but is preferably about 0.1 to 10 d (denier) on average.

The dyeing method may be preferably carried out as follows: the fiber material is immersed in an aqueous medium comprising the disperse dye composition of the present invention dissolved therein, and dyed under pressure preferably at 105° C. or higher, further preferably at 110° C. to 140° C., for 30 minutes to 1 hour. The fiber material can also be dyed in the presence of a carrier such as o-phenylphenol or trichlorobenzene, for example, under the state where water is boiled. Alternatively, so-called thermosol process for dyeing may be performed including the steps of padding cloth with dye dispersion liquid of the disperse dye composition according to the present invention, and dry heating the cloth at 150 to 230° C. for 30 seconds to 1 minute.

On the other hand, printing may be performed including the steps of preparing a printing paste using the disperse dye composition of the present invention together with a natural paste (e.g. a locust bean gum and a guar gum), a processed paste (e.g. a fibrin derivative such as carboxymethyl cellulose and a processed locust bean gum), or a synthetic paste (e.g. polyvinyl alcohol and polyvinyl acetic acid), printing cloth with the paste, and then performing steaming or thermosol process.

Alternatively, dyeing by ink jet printing may be performed including the steps of preparing an ink by adding a moisturizer such as glycerin or diethylene glycol to the disperse dye composition of the present invention, printing on cloth which is previously applied with a paste by padding or the like, by a ink jet printer, and then performing steaming or thermosol process.

In dyeing using the disperse dye composition of the present invention, any amount of the composition can be used. In a preferable aspect, the amount is, for example, 0.05 to 20% o.w.f. (on weight of fiber), preferably 0.2 to 10% o.w.f. for fiber of 3 denier.

EXAMPLES

The present invention will be described in detail with reference to the following Examples, but it is not intended to be limited to the Examples. In the Examples, "part(s)" and "%" mean "part(s) by weight" and "% by weight", respectively.

Examples 1 to 6 and Reference Examples 1 to 6

The component formulation of each of disperse dye compositions in Examples 1 to 6 and the component formulation of each of disperse dye compositions in Reference Examples 1 to 6 were shown in the following Table 1-1 and Table 1-2, respectively. Respective dye components were blended, thereafter the same amount of a dispersant as that of the dye components was added thereto, and the resultant was subjected to a pulverization treatment, thereby producing a disperse dye composition.

TABLE 1-1

|  | Example 1 | Example 2 | Example 3 | Example 4 | Example 5 | Example 6 |
| --- | --- | --- | --- | --- | --- | --- |
| Formula (1) | 2.1 | 2.0 | 3.5 | 3.2 | 4.4 | 4.9 |
| Formula (2) | 48.1 | 45.0 | 55.0 | 35.2 | 42.1 | 42.1 |
| Formula (3) | 6.3 | 5.8 | 11.5 | 8.5 | 5.3 | 12.1 |
| Formula (4) | 25.7 | 26.2 | 18.3 | 31.0 | 20.5 | 23.0 |
| Formula (5) | 17.8 | 17.2 | 11.2 | 22.1 | 27.7 | 17.9 |
| Formula (6) |  |  |  |  |  |  |
| Formula (7) |  |  |  |  |  |  |
| Formula (8) |  |  |  |  |  |  |
| Formula (9-1) |  |  |  |  |  |  |
| Formula (9-2) |  |  |  |  |  |  |
| Formula (9-3) |  | 3.8 | 0.5 |  |  |  |
| Light fastness | 3-4 | 3-4 | 3-4 | 3-4 | 3-4 | 3-4 |

TABLE 1-2

|  | Reference Example 1 | Reference Example 2 | Reference Example 3 | Reference Example 4 | Reference Example 5 | Reference Example 6 |
| --- | --- | --- | --- | --- | --- | --- |
| Formula (1) |  |  |  |  |  |  |
| Formula (2) |  |  |  |  |  |  |
| Formula (3) |  |  |  |  |  |  |
| Formula (4) |  |  |  |  |  |  |
| Formula (5) |  |  |  |  |  |  |
| Formula (6) | 15.5 | 9.8 | 18.5 |  |  |  |
| Formula (7) | 75.0 | 76.9 | 67.0 |  |  |  |
| Formula (8) | 9.5 | 13.3 | 14.5 |  |  |  |
| Formula (9-1) |  |  |  | 25.2 | 24.1 | 33.5 |
| Formula (9-2) |  |  |  | 41.8 | 52.5 | 37.8 |
| Formula (9-3) |  |  |  | 33.0 | 23.4 | 28.7 |
| Light fastness | 3-4 | 3-4 | 3-4 | 3-4 | 3-4 | 3-4 |

To pure water was added 1.0% o.w.f. (on the weight of fiber) of each of the disperse dye compositions; the resultant was adjusted by acetic acid and sodium acetate so that the pH thereof reached 4.5; 2.0% o.w.f. of Sunlife LPX-80 (produced by Nicca Chemical Co., Ltd., ultraviolet absorbing agent) was added thereto to prepare a dye bath having a total amount of 2000 parts; 100 parts of a polyester fiber raised fabric (using a 0.3 denier yarn on the front side and a 3 denier yarn on the wrong side) was immersed in the dye bath and dyed at 135° C. for 30 minutes; and then the dyed object was subjected to reduction washing at 80° C. for 10 minutes in a bath which was obtained by adding water to 6 parts of 45% sodium hydroxide, 6 parts of hydrosulfite and 3 parts of Sunmall RC-700 (produced by Nicca Chemical Co., Ltd., anionic surfactant) so that the total amount was 3000 parts, and was washed with water and dried to provide the final dyed object. The light fastness of the resulting dyed object was measured by a method described later, and listed in the corresponding Table.

Comparative Example 1

The same dyeing as in Example 1 was performed except that 1.0% o.w.f. of a blue disperse dye composition, Dianix Blue KIS-M (commercially available from DyStar Colours Distribution GmbH), was used instead of the blue disperse dye composition in Example 1. The light fastness of the resulting dyed object was measured by the method described later, and found to be 3.

Comparative Example 2

The same dyeing as in Example 1 was performed except that 1.0% o.w.f. of a blue disperse dye composition, Teratop Blue HL-B (commercially available from Ciba Specialty Chemicals Corporation), was used instead of the blue disperse dye composition in Example 1. The light fastness of the resulting dyed object was measured by the method described later, and found to be 3.

Example 7

To pure water were added 0.42% o.w.f. of the yellow disperse dye composition in Reference Example 1, 0.19% o.w.f. of the red disperse dye composition in Reference Example 4 and 0.41% o.w.f. of the blue disperse dye composition in Example 2; the resultant was adjusted by acetic acid and sodium acetate so that the pH thereof reached 4.5; 2.0% o.w.f. of Sunlife LPX-80 (produced by Nicca Chemical Co., Ltd., ultraviolet absorbing agent) was added thereto to prepare a dye bath having a total amount of 2000 parts; 100 parts of a polyester fiber raised fabric (using a 0.3 denier yarn on the front side and a 3 denier yarn on the wrong side) was immersed in the dye bath and dyed at 135° C. for 30 minutes; and then the dyed object was subjected to reduction washing at 80° C. for 10 minutes in a bath which was obtained by adding water to 6 parts of 45% sodium hydroxide, 6 parts of hydrosulfite and 3 parts of Sunmall RC-700 (produced by Nicca Chemical Co., Ltd., anionic surfactant) so that the total amount was 3000 parts, and was washed with water and dried to provide the final dyed object having a beige color. The light fastness of the resulting dyed object and the difference in shade between the front and wrong sides thereof were measured by methods described later, and listed in Table 2.

Example 8

The same dyeing and post-treatment as in Example 7 were performed except that 0.26% o.w.f. of the yellow disperse dye composition in Reference Example 1, 0.16% o.w.f. of the red disperse dye composition in Reference Example 4 and 0.60% o.w.f. of the blue disperse dye composition in Example 2 were used, thereby providing a dyed object having a gray color. The light fastness of the resulting dyed object and the difference in shade between the front and wrong sides thereof were measured by the methods described later, and listed in Table 2.

Comparative Example 3

The same dyeing and post-treatment as in Example 7 were performed except that 0.830% o.w.f. of a yellow disperse dye composition, Dianix Yellow AM-2R, 0.140% o.w.f. of a red disperse dye composition, Dianix Red AM-SLR, and 0.324% o.w.f. of a blue disperse dye composition, Dianix Blue AM-2G (all of them being commercially available from DyStar Colours Distribution GmbH) were used instead of the disperse dye compositions of the respective colors in Example 7, thereby providing a dyed object having a beige color. The light fastness of the resulting dyed object and the difference in shade between the front and wrong sides thereof were measured by the methods described later, and listed in Table 2.

Comparative Example 4

The same dyeing and post-treatment as in Example 7 were performed except that 0.476% o.w.f. of a yellow disperse dye composition, Foron Yellow AS-3L, 0.345% o.w.f. of a red disperse dye composition, Foron Red AS-3L, and 0.446% o.w.f. of a blue disperse dye composition, Foron Blue AS-3L (all of them being commercially available from Clariant Corp.) were used instead of the disperse dye compositions of the respective colors in Example 7, thereby providing a dyed object having a beige color. The light fastness of the resulting dyed object and the difference in shade between the front and wrong sides thereof were measured by the methods described later, and listed in Table 2.

Comparative Example 5

The same dyeing and post-treatment as in Example 8 were performed except that 0.510% o.w.f. of a yellow disperse dye composition, Dianix Yellow AM-2R, 0.125% o.w.f. of a red disperse dye composition, Dianix Red AM-SLR, and 0.488% o.w.f. of a blue disperse dye composition, Dianix Blue AM-2G (all of them being commercially available from DyStar Colours Distribution GmbH) were used instead of the disperse dye compositions of the respective colors in Example 8, thereby providing a dyed object having a gray color. The light fastness of the resulting dyed object and the difference in shade between the front and wrong sides thereof were measured by the methods described later, and listed in Table 2.

Comparative Example 6

The same dyeing and post-treatment as in Example 8 were performed except that 0.279% o.w.f. of a yellow disperse dye, Foron Yellow AS-3L, 0.279% o.w.f. of a red disperse dye composition, Foron Red AS-3L, and 0.615% o.w.f. of a blue disperse dye composition, Foron Blue AS-3L (all of them being commercially available from Clariant Corp.) were used instead of the disperse dye compositions of the respective colors in Example 8, thereby providing a dyed object having a gray color. The light fastness of the resulting dyed object and the difference in shade between the front and wrong sides thereof were measured by the methods described later, and listed in Table 2.

[Test Method of Light Fastness]

Each of the dyed objects was irradiated using a fade meter (black panel temperature: 89° C.±3° C., 84 MJ) xenon lamp, and color change and fading of the irradiated part were determined by the gray scale for color change and fading according to JIS L-0804. The results were shown in Tables 1 and 2.

[Difference in Shade Between Front and Wrong Sides]

The difference in shade between the front and wrong sides of each of the dyed polyester fiber raised fabrics (using a 0.3 denier yarn on the front side and a 3 denier yarn on the wrong side) was visually determined. The results were shown in Table 2.

TABLE 2

| | | Light fastness | Hue difference between front and wrong sides |
|---|---|---|---|
| Beige color | Example 7 | 3-4 | Substantially equal |
| | Comparative Example 3 | 3-4 Green discoloration | Remarkable green discoloration on wrong side |
| | Comparative Example 4 | 3-4 Green discoloration | Considerable red discoloration on wrong side |
| Gray color | Example 8 | 4 | Substantially equal |
| | Comparative Example 5 | 3-4 Green discoloration | Remarkable green discoloration on wrong side |
| | Comparative Example 6 | 4 Green discoloration | Considerable red discoloration on wrong side |

As is clear from the foregoing results of Examples, Reference Examples and Comparative Examples, it was found that the blue disperse dye composition or the mixed disperse dye composition of the blue disperse dye composition with other disperse dye compositions, according to the present invention, exhibited an excellent light fastness at the time of dyeing a hydrophobic fiber material, as compared with a commercially available blue disperse dye composition. It was also found that even when the mixed disperse dye composition of the blue disperse dye composition with other specified disperse dye compositions, according to the present invention, was used to dye, to a beige color or a gray color, a fiber material being a hydrophobic fiber material having front and wrong sides having difference fineness from each other, the front and wrong sides were substantially equally dyed, dyeing properties at dyeing were even, and dyeing reproducibility was favorable. On the other hand, the fiber materials in Comparative Examples 3 to 6, having different fineness, did not have even dyeing properties, and had a low dyeing reproducibility. This indicates that the disperse dye composition of the present invention has a high practicality.

INDUSTRIAL APPLICABILITY

Since the mixed disperse dye composition according to the present invention has an excellent light fastness, has a well-balanced fastness among the three primary colors, and also has even dyeing properties of the respective colors at dyeing and a favorable dyeing reproducibility, the mixed disperse dye composition can be suitably used to dye a synthetic fiber material, in particular, a hydrophobic fiber material, for an automotive interior material which is to be exposed to sunlight over a much longer time than other common clothing fiber material and which is easily subjected to high temperature and high humidity.

The invention claimed is:

1. A blue disperse dye composition, comprising:

0.5 to 5.0% by weight of a disperse dye represented by the following formula (1);

25.0 to 60.0% by weight of a disperse dye represented by the following formula (2);

3.0 to 15.0% by weight of a disperse dye represented by the following formula (3);

15.0 to 40.0% by weight of a disperse dye represented by the following formula (4); and 10.0 to 30.0% by weight of a disperse dye represented by the following formula (5);

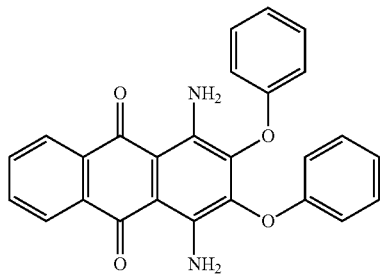

(1)

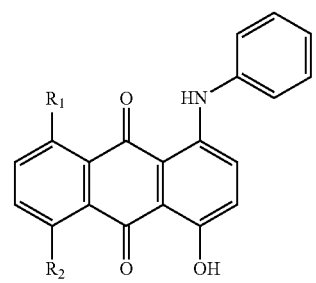

(2)

wherein $R_1$ represents a nitro group and $R_2$ represents a hydroxyl group, or $R_1$ represents a hydroxyl group and $R_2$ represents a nitro group;

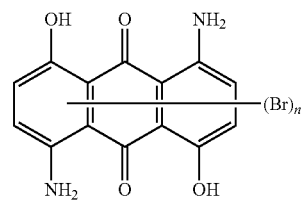

(3)

wherein n is an integer of 1 to 4;

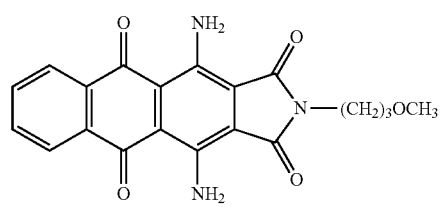

(4)

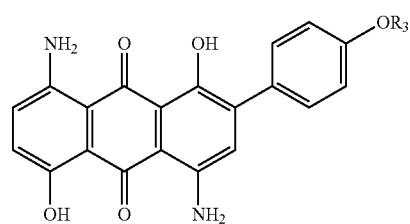

(5)

wherein $R_3$ represents a methyl group or an ethyl group, or a mixture thereof.

2. A mixed disperse dye composition comprising the blue disperse dye composition according to claim 1 and a yellow disperse dye composition,
wherein the yellow disperse dye composition comprises:
8.0 to 20.0% by weight of a disperse dye represented by the following formula (6);
55.0 to 80.0% by weight of a disperse dye represented by the following formula (7); and
5.0 to 15.0% by weight of a disperse dye represented by the following formula (8)

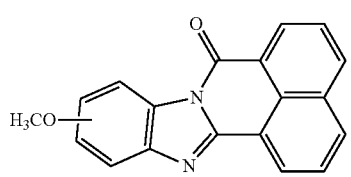
(6)

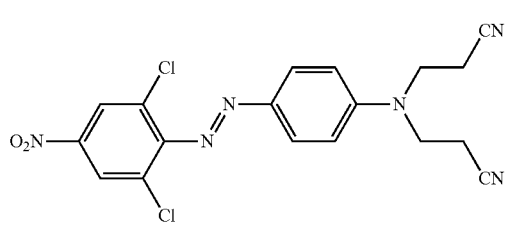
(7)

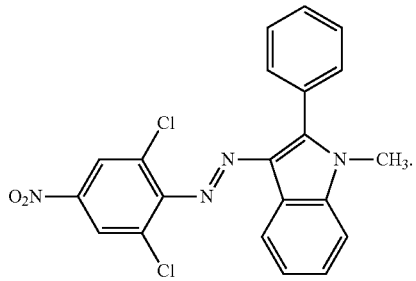
(8)

3. A mixed disperse dye composition, comprising:
the blue disperse dye composition according to claim 1; and
a red disperse dye composition which is one or more dyes selected from disperse dyes represented by the following formula (9);

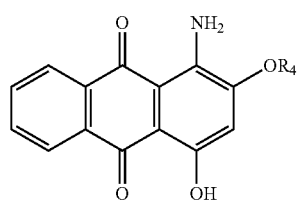
(9)

wherein $R_4$ represents an optionally substituted alkyl group having 1 to 6 carbon atoms, or an optionally substituted phenyl group.

4. The mixed disperse dye composition according to claim 3, wherein the red disperse dye composition is a red disperse dye composition comprising one or more dyes selected from dyes of the following formula (9-1), the following formula (9-2) and the following formula (9-3):

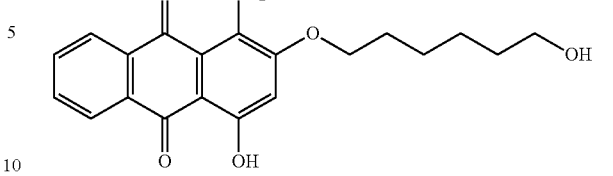
(9-1)

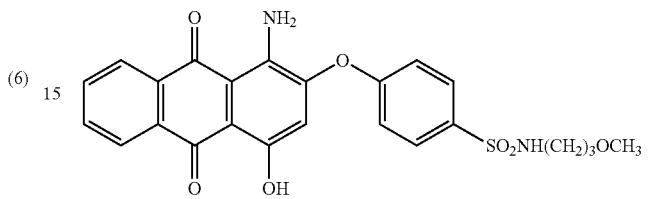
(9-2)

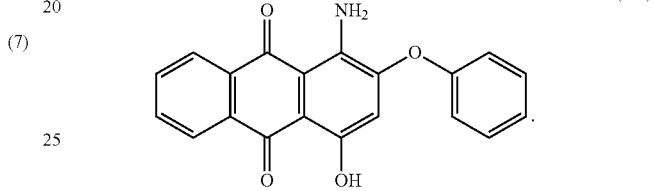
(9-3)

5. A mixed disperse dye composition, comprising:
the mixed disperse dye composition according to claim 2; and
a red disperse dye composition comprising one or more dyes selected from dyes of the following formula (9-1), the following formula (9-2) and the following formula (9-3):

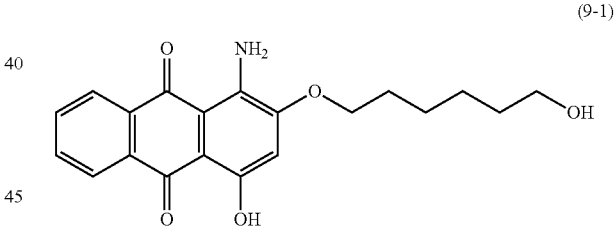
(9-1)

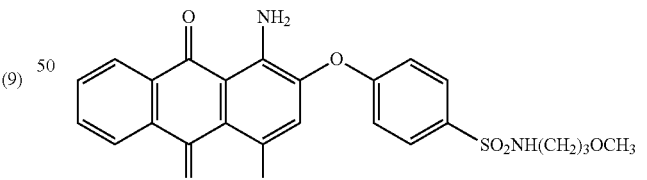
(9-2)

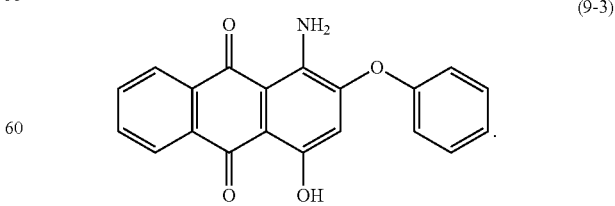
(9-3)

6. A dyeing method for a hydrophobic fiber material, wherein the disperse dye composition according to claim 1 is used.

7. A hydrophobic fiber material dyed in accordance with the dyeing method according to claim 6.

8. An article comprising the hydrophobic fiber material according to claim 7.

9. A dyeing method for a hydrophobic fiber material, wherein the disperse dye composition according to claim 2 is used.

10. A hydrophobic fiber material dyed in accordance with the dyeing method according to claim 9.

11. An article comprising the hydrophobic fiber material according to claim 10.

12. A dyeing method for a hydrophobic fiber material, wherein the disperse dye composition according to claim 3 is used.

13. A hydrophobic fiber material dyed in accordance with the dyeing method according to claim 12.

14. An article comprising the hydrophobic fiber material according to claim 13.

15. A dyeing method for a hydrophobic fiber material, wherein the disperse dye composition according to claim 4 is used.

16. A hydrophobic fiber material dyed in accordance with the dyeing method according to claim 15.

17. An article comprising the hydrophobic fiber material according to claim 16.

18. A dyeing method for a hydrophobic fiber material, wherein the disperse dye composition according to claim 5 is used.

19. A hydrophobic fiber material dyed in accordance with the dyeing method according to claim 18.

20. An article comprising the hydrophobic fiber material according to claim 19.

\* \* \* \* \*